US012776987B2

(12) United States Patent
Barth et al.

(10) Patent No.: US 12,776,987 B2
(45) Date of Patent: Oct. 27, 2026

(54) MANAGING POWER STATES OF AGGREGATED LINKS OF A NETWORK DEVICE

(71) Applicant: Juniper Networks, Inc., Sunnyvale, CA (US)

(72) Inventors: Jonathan C. Barth, Collegeville, PA (US); Srihari Ramachandra Sangli, Bengaluru (IN); Vyasraj Satyanarayana, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 327 days.

(21) Appl. No.: 18/512,390

(22) Filed: Nov. 17, 2023

(65) Prior Publication Data

US 2025/0106768 A1 Mar. 27, 2025

(30) Foreign Application Priority Data

Sep. 26, 2023 (IN) ............................. 202341064503

(51) Int. Cl.
*H04L 45/00* (2022.01)
*G06F 1/28* (2006.01)
(Continued)

(52) U.S. Cl.
CPC ................ *H04L 45/70* (2013.01); *G06F 1/28* (2013.01); *G06F 1/3206* (2013.01);
(Continued)

(58) Field of Classification Search
CPC ..... H04L 45/70; H04L 12/12; H04L 41/0622; H04L 41/0627; H04L 41/069;
(Continued)

(56) References Cited

U.S. PATENT DOCUMENTS

| | | | |
|---|---|---|---|
| 5,367,517 | A | 11/1994 | Cidon et al. |
| 7,417,985 | B1 | 8/2008 | McCrosky et al. |

(Continued)

FOREIGN PATENT DOCUMENTS

| | | | |
|---|---|---|---|
| CN | 113841106 | A | 12/2021 |
| CN | 115550286 | A | 12/2022 |
| CN | 116017782 | A | 4/2023 |
| EP | 4061063 | A1 | 9/2022 |
| WO | 2012155987 | A1 | 11/2012 |
| WO | 2022228085 | A1 | 11/2022 |

OTHER PUBLICATIONS

Martin Rostan, "IEEE P802.1, Draft 1.0, Bridges and Bridged Networks—Link Aggregation," IEEE 802.1 Working Group, Dec 2020, Nürnberg, Germany, 349 Pages.

(Continued)

*Primary Examiner* — Kan Yuen
(74) *Attorney, Agent, or Firm* — Harrity & Harrity, LLP

(57) ABSTRACT

A first network device may generate a first protocol data unit (PDU) identifying a request to transition from a power on state to a power sleep state, and may provide the first PDU to a second network device. The first network device may receive a second PDU identifying a link of the second network device to transition from the power on state to the power sleep state, and may generate a third PDU identifying a link of the first network device to transition from the power on state to the power sleep state. The first network device may provide the third PDU to the second network device, and may transition the link of the first network device and the link of the second network device from the power on state to the power sleep state based on the second PDU and the third PDU.

21 Claims, 9 Drawing Sheets

(51) Int. Cl.

| | |
|---|---|
| ***G06F 1/3206*** | (2019.01) |
| ***G06F 1/3234*** | (2019.01) |
| ***H04L 12/12*** | (2006.01) |
| ***H04L 41/0604*** | (2022.01) |
| ***H04L 41/069*** | (2022.01) |
| ***H04L 43/10*** | (2022.01) |
| ***H04L 45/02*** | (2022.01) |
| ***H04L 45/03*** | (2022.01) |
| ***H04L 45/12*** | (2022.01) |
| ***H04L 45/24*** | (2022.01) |
| ***H04L 45/28*** | (2022.01) |
| ***H04L 47/10*** | (2022.01) |
| ***H04L 47/12*** | (2022.01) |
| ***H04L 47/125*** | (2022.01) |
| ***H04W 52/02*** | (2009.01) |
| *G06Q 30/018* | (2023.01) |

(52) U.S. Cl.

CPC ............ *G06F 1/3234* (2013.01); *H04L 12/12* (2013.01); *H04L 41/0622* (2013.01); *H04L 41/0627* (2013.01); *H04L 41/069* (2013.01); *H04L 43/10* (2013.01); *H04L 45/02* (2013.01); *H04L 45/03* (2022.05); *H04L 45/126* (2013.01); *H04L 45/245* (2013.01); *H04L 45/28* (2013.01); *H04L 47/12* (2013.01); *H04L 47/125* (2013.01); *H04L 47/29* (2013.01); *H04W 52/0235* (2013.01); *H04W 52/0248* (2013.01); *H04W 52/0274* (2013.01); *G06Q 30/018* (2013.01)

(58) Field of Classification Search

CPC ......... H04L 43/10; H04L 45/02; H04L 45/03; H04L 45/126; H04L 45/245; H04L 45/28; H04L 47/12; H04L 47/125; H04L 47/29; H04L 41/145; G06F 1/28; G06F 1/3206; G06F 1/3234; H04W 52/0235; H04W 52/0248; H04W 52/0274; H04W 40/005; G06Q 30/018; Y02D 30/00

See application file for complete search history.

(56) References Cited

U.S. PATENT DOCUMENTS

| | | | | |
|---|---|---|---|---|
| 8,340,111 | B1 | 12/2012 | Krivitski et al. | |
| 8,570,160 | B2 | 10/2013 | Speegle et al. | |
| 9,509,377 | B2 | 11/2016 | Sayana et al. | |
| 9,606,604 | B1 | 3/2017 | Butter | |
| 9,992,129 | B2 | 6/2018 | Grosso et al. | |
| 10,326,638 | B2 | 6/2019 | Banerjee et al. | |
| 10,552,253 | B2 | 2/2020 | Iyer et al. | |
| 10,819,556 | B1 | 10/2020 | Rangasamy et al. | |
| 10,972,293 | B1 | 4/2021 | Benyamin et al. | |
| 12,021,689 | B1 | 6/2024 | Rayes et al. | |
| 12,079,061 | B2 | 9/2024 | Srivastava et al. | |
| 2003/0185208 | A1 | 10/2003 | Lee et al. | |
| 2003/0202468 | A1 | 10/2003 | Cain et al. | |
| 2007/0201380 | A1 | 8/2007 | Ma et al. | |
| 2007/0283178 | A1 | 12/2007 | Dodeja et al. | |
| 2008/0304519 | A1 | 12/2008 | Koenen et al. | |
| 2009/0204828 | A1 | 8/2009 | Diab et al. | |
| 2010/0057386 | A1 | 3/2010 | Hillis et al. | |
| 2010/0118753 | A1 | 5/2010 | Mandin et al. | |
| 2010/0277296 | A1 | 11/2010 | DeMille | |
| 2011/0038291 | A1* | 2/2011 | Seok | H04W 52/0235 370/311 |
| 2011/0161709 | A1 | 6/2011 | Chen | |
| 2011/0310736 | A1 | 12/2011 | Dighe et al. | |
| 2012/0063364 | A1* | 3/2012 | Emmelmann | H04W 48/16 370/255 |
| 2012/0127894 | A1 | 5/2012 | Nachum | |
| 2013/0003559 | A1 | 1/2013 | Matthews | |
| 2013/0042126 | A1 | 2/2013 | Ganesan et al. | |
| 2013/0070754 | A1 | 3/2013 | Iovanna et al. | |
| 2013/0286846 | A1 | 10/2013 | Atlas et al. | |
| 2013/0322258 | A1 | 12/2013 | Nedeltchev et al. | |
| 2013/0332762 | A1* | 12/2013 | Meirosu | H04L 12/12 713/323 |
| 2014/0119252 | A1 | 5/2014 | Kella et al. | |
| 2014/0155029 | A1 | 6/2014 | Kolaks et al. | |
| 2014/0169176 | A1* | 6/2014 | Brock | H04L 47/125 370/400 |
| 2014/0191733 | A1 | 7/2014 | Kaanta et al. | |
| 2014/0321315 | A1 | 10/2014 | Akhter et al. | |
| 2014/0372576 | A1 | 12/2014 | Mohandas et al. | |
| 2015/0188354 | A1 | 7/2015 | Sun et al. | |
| 2015/0208341 | A1 | 7/2015 | Mohamed et al. | |
| 2015/0288599 | A1* | 10/2015 | Zhou | H04L 45/70 370/338 |
| 2015/0312769 | A1 | 10/2015 | Shindo | |
| 2016/0094435 | A1 | 3/2016 | Goss et al. | |
| 2016/0164794 | A1 | 6/2016 | Ramalingam et al. | |
| 2016/0197784 | A1 | 7/2016 | Gandhi et al. | |
| 2016/0253522 | A1 | 9/2016 | Wirch et al. | |
| 2016/0302203 | A1 | 10/2016 | Liu et al. | |
| 2017/0117709 | A1 | 4/2017 | Svedendahl et al. | |
| 2017/0201425 | A1 | 7/2017 | Marinelli et al. | |
| 2017/0214539 | A1 | 7/2017 | Chu et al. | |
| 2018/0206190 | A1* | 7/2018 | Cherian | H04L 5/00 |
| 2018/0241466 | A1 | 8/2018 | Inagaki | |
| 2018/0343613 | A1 | 11/2018 | Levy et al. | |
| 2019/0163255 | A1 | 5/2019 | Dewey et al. | |
| 2019/0190575 | A1 | 6/2019 | Stjernman et al. | |
| 2019/0258807 | A1 | 8/2019 | DiMaggio et al. | |
| 2020/0067821 | A1 | 2/2020 | Sebastian | |
| 2020/0250125 | A1 | 8/2020 | Yoshihara et al. | |
| 2020/0371578 | A1 | 11/2020 | Murali et al. | |
| 2021/0044444 | A1 | 2/2021 | Shukla et al. | |
| 2021/0216685 | A1* | 7/2021 | Su | H04L 41/0213 |
| 2021/0218704 | A1 | 7/2021 | Shi et al. | |
| 2021/0385692 | A1* | 12/2021 | Kwon | H04W 28/24 |
| 2022/0011840 | A1 | 1/2022 | Parks et al. | |
| 2022/0116862 | A1 | 4/2022 | Cariou | |
| 2022/0166705 | A1 | 5/2022 | Froese | |
| 2022/0239547 | A1 | 7/2022 | Wang et al. | |
| 2022/0369403 | A1 | 11/2022 | Fang et al. | |
| 2023/0029987 | A1 | 2/2023 | Gandhi et al. | |
| 2023/0062989 | A1 | 3/2023 | Kim et al. | |
| 2023/0319722 | A1* | 10/2023 | Wang | H04W 52/0248 370/311 |
| 2023/0325342 | A1 | 10/2023 | Srivastava et al. | |
| 2023/0393772 | A1 | 12/2023 | Benisty et al. | |
| 2024/0137860 | A1* | 4/2024 | Asterjadhi | H04W 52/0206 |
| 2024/0205823 | A1 | 6/2024 | Yang et al. | |
| 2024/0214313 | A1 | 6/2024 | Voit et al. | |
| 2024/0256014 | A1 | 8/2024 | Brar et al. | |
| 2024/0333590 | A1 | 10/2024 | Pignataro et al. | |
| 2024/0349373 | A1* | 10/2024 | Dong | H04W 76/12 |
| 2024/0381259 | A1 | 11/2024 | Mondal et al. | |
| 2024/0422101 | A1 | 12/2024 | Sivakumar et al. | |
| 2025/0007810 | A1 | 1/2025 | Ashlock et al. | |
| 2025/0039057 | A1 | 1/2025 | Ashlock et al. | |
| 2025/0039097 | A1 | 1/2025 | Kazimirsky et al. | |
| 2025/0080464 | A1 | 3/2025 | Pignataro et al. | |
| 2025/0193954 | A1* | 6/2025 | Yun | H04L 47/28 |
| 2025/0358745 | A1* | 11/2025 | Fu | H04W 52/367 |
| 2026/0172322 | A1* | 6/2026 | Guo | H04L 41/14 |

OTHER PUBLICATIONS

Dhanuka et al., "How to Use Energy Efficient Ethernet (IEEE 802.3az) With Texas Instruments Ethernet PHYs," Texas Instruments, SNLA328—Oct. 2019, 15 Pages.

Prosecution history of U.S. Appl. No. 18/647,362, filed Apr. 26, 2024.

Extended European Search Report for European Application No. EP24151927 dated Jul. 16, 2024, 10 pages.

(56) References Cited

OTHER PUBLICATIONS

Bierman et al., "A YANG Data Model for Hardware Management," Internet Engineering Task Force (IETF), Request for Comments: 8348, Mar. 2018, 60 Pages.
Bierman et al., "A YANG Data Model for System Management," Internet Engineering Task Force (IETF), Request for Comments: 7317, Aug. 2014, 35 Pages.
Bjorklund et al., "The YANG 1.1 Data Modeling Language," Internet Engineering Task Force (IETF), Request for Comments: 7950, Aug. 2016, 217 Pages.
Bjorklund, M., (Ed.,) "YANG-A Data Modeling Language for the Network Configuration Protocol (NETCONF)," IETF Rfc 6020, http://datatracker.ietforg/doc/rfc6020/, Oct. 2010, 173 pages.
Bonica et al., "Extended ICMP to Support Multi-Part Messages," Network Working Group, Request for Comments:4884, Apr. 2007, 19 Pages.
"Chkirbene, Z., et al., "Efficient Techniques for Energy Saving in Data Center Networks", Computer Communications, Elsevier Science Publishers BV, Amsterdam, NL, vol. 129, Jul. 29, 2018, pp. 111-124, XP085477963, ISSN: 0140-3664, DOI:10.1016/J.COMCOM.2018.07.025".
Ethernet Switching User Guide, Juniper Networks, Website: https://standards.ieee.org/ieee/802.1AB/6047/, Dec. 14, 2023, 1158 Pages.
Extended European Search Report for European Application No. EP24150429.9 dated Jul. 2, 2024, 11 pages.
Extended European Search Report for European Application No. EP241871235 dated Dec. 6, 2024, 10 pages.
Extended European Search Report for European Application No. EP241877513 dated Dec. 9, 2024, 41 pages.
Extended European Search Report for European Application No. EP24188097 dated Dec. 18, 2024, 8 pages.
Ginsberg et al., "Advertising Generic Information in IS-IS," Internet Engineering Task Force (IETF), Request for Comments: Dec 2010, 11 Pages.
Gupta, M., et al., Dynamic Ethernet Link Shutdown for Energy Conservation on Ethernet Links, IEEE International Conference on Communications (ICC), Jun. 1, 2007, pp. 6156-6161.
IEEE Standard for Local and metropolitan area networks, "Station and Media Access Control Connectivity Discovery," IEEE Computer Society, Website: https://www.juniper.net/documentation/US/en/software/junos/useraccess/topics/ref/statement/lldp-edit-protocols.html, 2016, 146 Pages.
IEEE Standards Association., "Station and Media Access Control Connectivity Discovery," IEEE, Jan. 29, 2016, 146 pages.
Junos Os., "User Access and Authentication Administration Guide for Junos OS," Juniper Networks Inc, Jun. 14, 2023, 1786 pages.
Moy, J., "Extending OSPF to Support Demand Circuits," Network Working Group, Request for Comments: 1793, pp. 1-32, Apr. 1995.
OpenConfig: Platform model, Website: https://openconfig.net/projects/modelsischemadocs/jstree/openconfig-platform.html, Obtained Apr. 30, 2024, 199 Pages.
Website: https://en.wikipedia.org/wiki/Traceroute; Obtained Apr. 25, 2024, 5 Pages.

* cited by examiner

MANAGING POWER STATES OF AGGREGATED LINKS OF A NETWORK DEVICE

CROSS-REFERENCE TO RELATED APPLICATION

This patent application claims priority to India patent application No. 202341064503, filed on Sep. 26, 2023, and entitled "SYSTEMS AND METHODS FOR PROVIDING ENERGY EFFICIENT NETWORKS." The disclosure of the prior application is considered part of and is incorporated by reference into this patent application.

BACKGROUND

A network planner designs a network for worst-case traffic conditions while also catering to various potential resiliency scenarios. A capacity of a network may be under-utilized due to traffic conditions, and actual traffic patterns may exhibit periodicity with regards to overall network utilization.

SUMMARY

Some implementations described herein relate to a method. The method may include generating, by a first network device, a first protocol data unit (PDU) identifying a request to transition from a power on state to a power sleep state, and providing the first PDU to a second network device. Power sleep is a state of a link where consumption of power by the link is lesser than a power on state. Implementations can power off the link entirely or partially to put the link in a power sleep state. The method may include receiving, by a control channel link, a second PDU identifying a link of the second network device to transition from the power on state to the power sleep state, and generating a third PDU identifying a link of the first network device to transition from the power on state to the power sleep state. The method may include providing the third PDU to the second network device, and transitioning the link of the first network device and the link of the second network device from the power on state to the power sleep state based on the second PDU and the third PDU.

Some implementations described herein relate to a first network device. The first network device may include one or more memories and one or more processors. The one or more processors may be configured to generate a first PDU identifying a request to transition from a power on state to a power sleep state, and provide the first PDU to a second network device. The one or more processors may be configured to receive a second PDU identifying a link of the second network device to transition from the power on state to the power sleep state, and generate a third PDU identifying a link of the first network device to transition from the power on state to the power sleep state. The one or more processors may be configured to provide the third PDU to the second network device, and determine whether a sleep timer has expired based on the second PDU and the third PDU. The one or more processors may be configured to transition the link of the first network device and the link of the second network device from the power on state to the power sleep state based on determining that the sleep timer has expired.

Some implementations described herein relate to a non-transitory computer-readable medium that stores a set of instructions. The set of instructions, when executed by one or more processors of a first network device, may cause the first network device to generate a first PDU identifying a request to transition from a power on state to a power sleep state, and provide the first PDU to a second network device. The set of instructions, when executed by one or more processors of the first network device, may cause the first network device to receive an acknowledgement of the first PDU from the second network device, and receive a second PDU identifying a link of the second network device to transition from the power on state to the power sleep state. The set of instructions, when executed by one or more processors of the first network device, may cause the first network device to generate a third PDU identifying a link of the first network device to transition from the power on state to the power sleep state, and provide the third PDU to the second network device. The set of instructions, when executed by one or more processors of the first network device, may cause the first network device to transition the link of the first network device and the link of the second network device from the power on state to the power sleep state based on the second PDU and the third PDU.

DETAILED DESCRIPTION

Figure 1A:
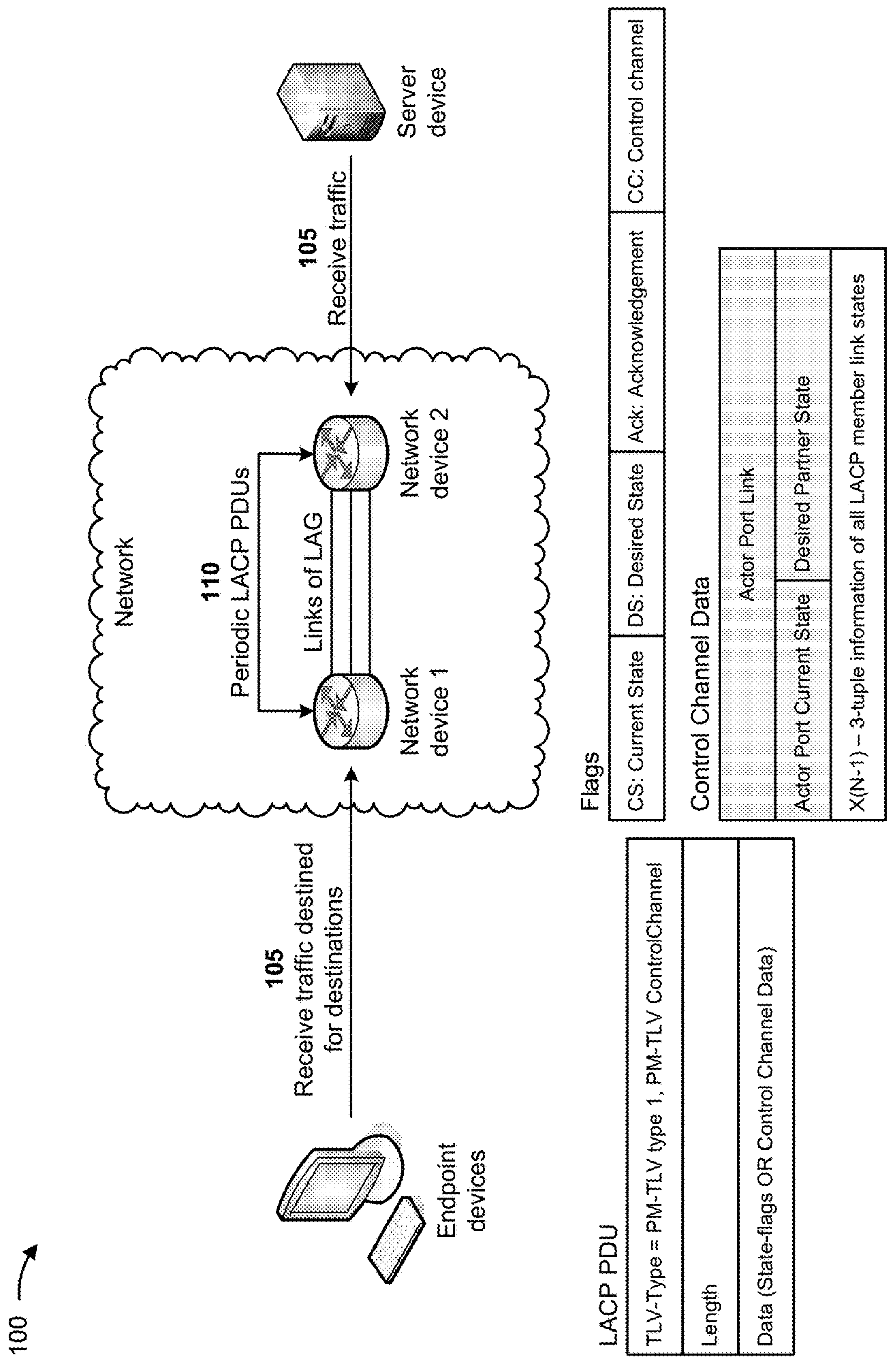
FIGS. 1A-1E are diagrams of an example associated with managing power states of aggregated links of a network device.

The following detailed description of example implementations refers to the accompanying drawings. The same reference numbers in different drawings may identify the same or similar elements.

In many networks, there is a large difference between peak network utilization and off-peak network utilization, and traffic patterns exhibit periodicity. Controlling a power life cycle of a network link (e.g., disabling a link during off-peak network utilization and reenabling the link during peak network utilization) may exploit power saving opportunities in a network. However, abruptly powering off and powering on a link may result in loss of traffic due to removal of an active link from a set of forwarding next-hop network devices. For example, links in a link aggregation group (LAG) must be gracefully added and removed from the LAG to minimize any loss of traffic during changes to link states. Current techniques for disabling a link (e.g., for energy efficiency) fail to entirely power off the link, which prevents powering off various components in a network device hierarchy (e.g., optical transceivers, lasers, and/or the like). Thus, current techniques for disabling a link consume computing resources (e.g., processing resources, memory resources, communication resources, and/or the like), networking resources, and/or the like, associated with failing to entirely power off the link, failing to power off components of a network device associated with the partially powered off link, losing traffic due to abruptly disabling the link, and/or the like.

Some implementations described herein relate to a network device that manages power states of aggregated links of the network device. For example, a first network device may generate a first protocol data unit (PDU) identifying a request to transition from a power on state to a power sleep state, and may provide the first PDU to a second network device. The first network device may receive a second PDU identifying a link of the second network device to transition from the power on state to the power sleep state, and may generate a third PDU identifying a link of the first network device to transition from the power on state to the power sleep state. The first network device may provide the third PDU to the second network device, and may transition the link of the first network device and the link of the second network device from the power on state to the power sleep state based on the second PDU and the third PDU.

In this way, the network device manages power states of aggregated links of the network device. For example, the network device may utilize enhancements to a link aggregation control protocol (LACP) to enable graceful transitions of power states of links in a LAG. The network device may also process actual traffic (e.g., in-system telemetry data) and predicted traffic (e.g., predicted telemetry data), with a model, to determine power state transitions of the links in the LAG, to manage the power states transitions of the links in the LAG, and/or the like. Thus, the network device conserves computing resources, networking resources, and/or the like that would otherwise have been consumed by failing to entirely power off the link, failing to power off components of a network device associated with the partially powered off link, losing traffic due to abruptly disabling the link, and/or the like.

FIGS. 1A-1E are diagrams of an example 100 associated with managing power states of aggregated links of a network device. As shown in FIGS. 1A-1E, example 100 includes endpoint devices and a server device associated with a network of network devices. Further details of the endpoint devices, the server device, the network, and the network devices are provided elsewhere herein.

As shown in FIG. 1A, the network may include a first network device (e.g., network device 1) and a second network device (e.g., network device 2). A LAG with a plurality of a links may be provided between the network device 1 and the network device 2. Each of the links of the LAG may include a state, such as a powered on state, a power sleep state, a powered off state, and/or the like. In the powered on state, a link may have been discovered and may be participating in receipt and/or transmission of data frames. In the power sleep state, a link may have been discovered and may be powered off (e.g., put offline) by a protocol. In the powered off state, a link may be administratively powered off.

As further shown in FIG. 1A, and by reference number 105, the network device 1 and/or the network device 2 may receive traffic destined for destinations. For example, the network device 1 may receive, from the endpoint devices, traffic destined for other endpoint devices and/or the server device. In another example, the network device 2 may receive, from the server device, traffic destined for one or more of the endpoint devices. In some implementations, the network device 1 and/or the network device 2 may receive the traffic from another network device of the network.

As further shown in FIG. 1A, and by reference number 110, the network device 1 and the network device 2 may exchange periodic LACP PDUs via one or more links of the LAG. For example, a format of each of the periodic LACP PDUs may include a new or custom type-length-value (TLV) parameter. The new TLV parameter may include a power management TLV (PM-TLV) parameter for managing power states of an aggregated link (e.g., a link in a LAG). The network device 1 and the network device 2 may exchange the periodic LACP PDUs based on timer settings (e.g., a slow or a fast timer settings). In some implementations, in addition to the periodic LACP PDUs, the network device 1 and/or the network device 2 may transmit an LACP PDU when there is need to transmit information to a partner port. Each LACP PDU may include a link affinity that describes a state for a link between an actor network device and a partner network device. When a link is in a powered off state, the states of the link may not be exchanged between the actor network device and the partner network device.

In some implementations, various applications, such as routing protocols, telemetry settings, configuration settings, and/or the like may interact with the LACP to transition a link to a desired link state. The LACP may interact with platform management software (e.g., of a network device) to power off and/or power on the links. In some implementations, two types of PM-TLVs may be encoded in an LACP PDU: a PM-TLV Type 1 that may be exchanged on links which are eligible for power state transition, and a PM-TLV control channel type. The PM-TLV control channel type may be associated with at least one member link (e.g., a control channel link) that will not participate in power state transition. Current power states of all links in a LAG may be periodically exchanged by peer network devices via the control channel link of the LAG. The control channel link may not be powered down.

The PM-TLV may enable a link to participate in dynamic power management. When the PM-TLV is not present in the LACP PDU, a link may not participate in the dynamic power management. As further shown in FIG. 1A, the LACP PDU may include a TLV-Type element, such as PM-TLV type 1 or the PM-TLV control channel type, a length element, and a data element, such as state-flags (e.g., for PM-TLV type 1) or control channel data. The state flags may be utilized for communicating, exchanging, and controlling future state transition of a link. The state flags may include a current state (CS) describing a current state of the link, a desired state (DS) describing a request for a change in state of the link, an acknowledgement (Ack) by a peer network device to a change of state request, and a control channel (CC) with a value (e.g., of “1”) that indicates that the link is used to manage states of other links in a LACP LAG. The control channel data may include an array that captures power states of all links in the LACP LAG. The control channel data may be expressed as three-tuple (e.g., an actor port link, an actor port current state, and a desired partner state). For example, if there are N links in the LACP LAG, all the current states may be encoded as an array value.

In some implementations, the LACP PDU may be associated with a power sleep action timer element. After negotiating with a peer network device to power off a link, each peer network device may wait for the power sleep action timer to expire before powering off a side of the link. The power sleep action timer may be derived based on various parameters, such as, for example, a time required to empty a queue. In some implementations, the power sleep action timer may be implementation specific and not exchanged via the LACP. In some implementations, information associated with peer network devices (e.g., discovered by the LACP) may be stored in a local database of a network device. The network device may utilize such information to manage a power state of a link, and may retain the information even when a link enters a power sleep state. The network device may revalidate the information when the link is powered back on.

Figure 1B:
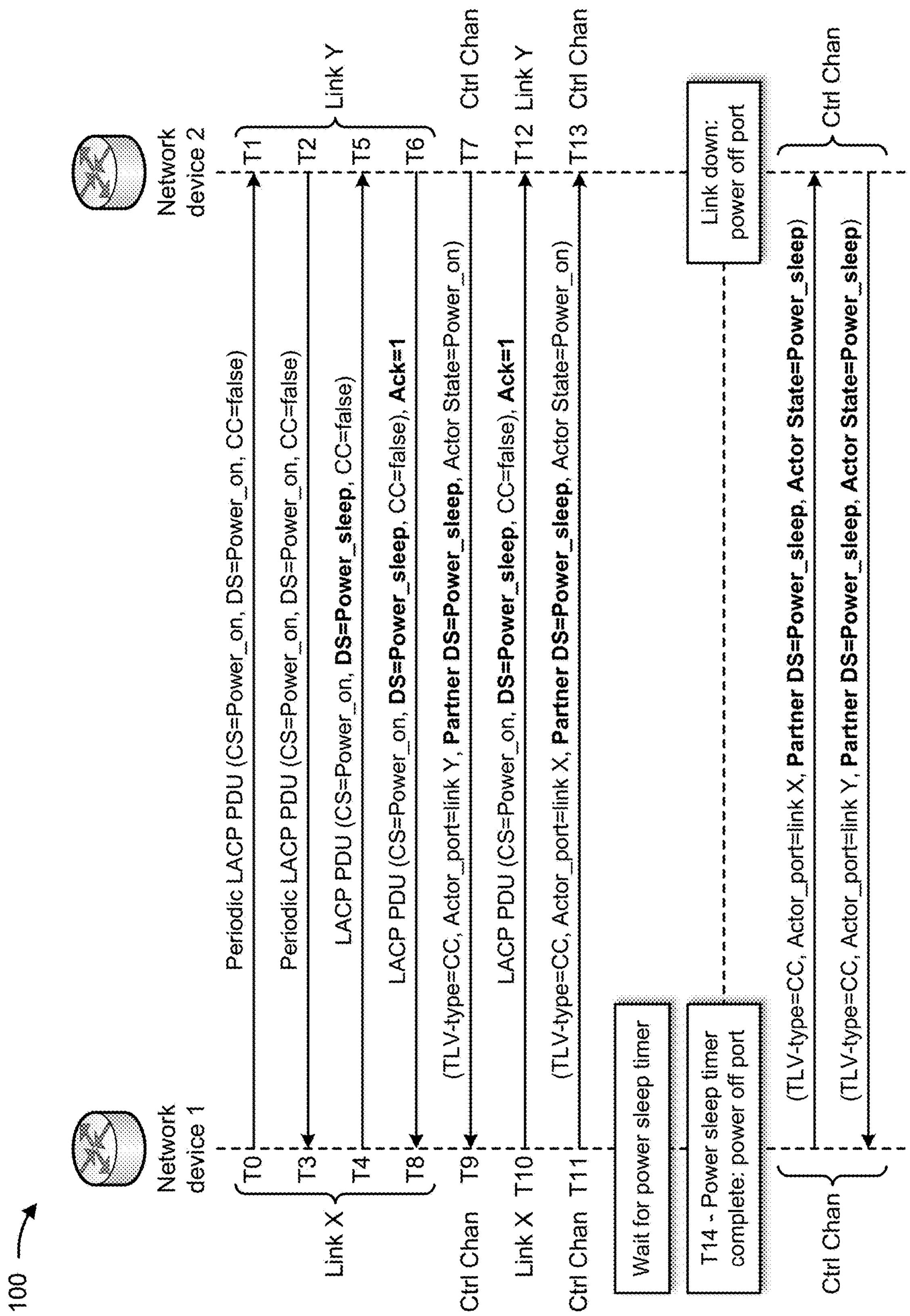

FIG. 1B depicts a call flow diagram associated with transitioning a link of a LAG from a power on state to a power sleep state. In some implementations, state transitions associated with a link may asynchronously occur. The example link connects the network device 1 and the network device 2. The link is a physical link identified by a link identifier X (e.g., link X) at the network device 1 and by a link identifier Y (e.g., link Y) at the network device 2. In some implementations, the network device 1 and the network device 2 may be associated with transitioning the link from the power on state to the power sleep state and may utilize a wait timer before transitioning the link. The network device 1 may be associated with a link (e.g., link X) to transition from the power on state to the power sleep state, and the network device 2 may associated with a link (e.g., link Y) to transition from the power on state to the power sleep state. Initially, both network devices may transmit periodic LACP PDUs with a state of {CS=Power_on, DS=Power_on, CC=false}. For example, at time T0, the network device 1 may transmit a first periodic LACP PDU to the network device 2, and the network device 2 may receive the first periodic LACP PDU at time T1. At time T2, the network device 2 may transmit a second periodic LACP PDU to the network device 1, and the network device 1 may receive the second periodic LACP PDU at time T3.

The network device 1 may initiate the transition from the power on state to the power sleep state. Thus, at time T4, the network device 1 may transmit a first LACP PDU (e.g., with a DS set to power sleep) to the network device 2. The network device 2 may receive the first LACP PDU at time T5. At time T6, the network device 2 may determine that the network device 2 is ready to transition the link (e.g., link Y) from the power on state to the power sleep state, and may generate a second LACP PDU (e.g., with a DS set to power sleep and an Ack set equal to one). The network device 2 may transmit the second LACP PDU towards the network device 1 at time T6. At time T7, the network device 2 may generate a third LACP PDU identifying a TLV type of the control channel, link Y, a partner desired state of power sleep, and an actor state of power on. The network device 2 may transmit the third LACP PDU towards the network device 1 via the control channel and at time T7. The network device 1 may receive the second LACP PDU at time T8, and may receive the third LACP PDU via the control channel and at time T9.

At time T10, the network device 1 may generate a fourth LACP PDU (e.g., with a DS set to power sleep and an Ack set equal to one). The network device 1 may transmit the fourth LACP PDU towards the network device 1 at time T10, completing a three-way handshake between the network device 1 and the network device 2. The three-way handshake may enable the network device 1 and/or the network device 2 to generate link alarms, to differentiate between a graceful link power sleep and a physical link failure event when transitioning a link, and/or the like. At time T11, the network device 1 may generate a fifth LACP PDU identifying a TLV type of the control channel, link X, a partner desired state of power sleep, and an actor state of power on. The network device 1 may transmit the fifth LACP PDU towards the network device 1 via the control channel and at time T11. The network device 2 may receive the fourth LACP PDU at time T12, and may receive the fifth LACP PDU via the control channel and at time T13. At times T10 and T12, the network device 1 and the network device 2 may empty link level queues and may cease transmitting traffic on links X and Y. Both the network device 1 and the network device 2 may continue to accept frames.

The network device 1 and the network device 2 may wait for expiration of a power sleep timer before transitioning links X and Y from the power on state to the power sleep state. Upon expiration of the power sleep timer (e.g., at time T14), the network device 1 may power off a port associated with link X. The network device 2 may detect a link down, and may power off a port associated with link Y based on detecting the link down. Once the link is powered off at both network devices, the network device 1 and the network device 2 may utilize the control channel to exchange LACP PDUs with an actor State and a partner desired state set to power sleep.

In some implementations, since both network devices independently determine whether to change a link state to a power sleep state or maintain the link state in a power on state, the network device 2 may not agree with a request for entering the power sleep state. In such implementations, the network device 2 may acknowledge the request by setting an acknowledge bit to zero and a desired state to a power on state. On receiving, the acknowledgement set to zero, the network device 1 may not take any further action.

Figure 1C:
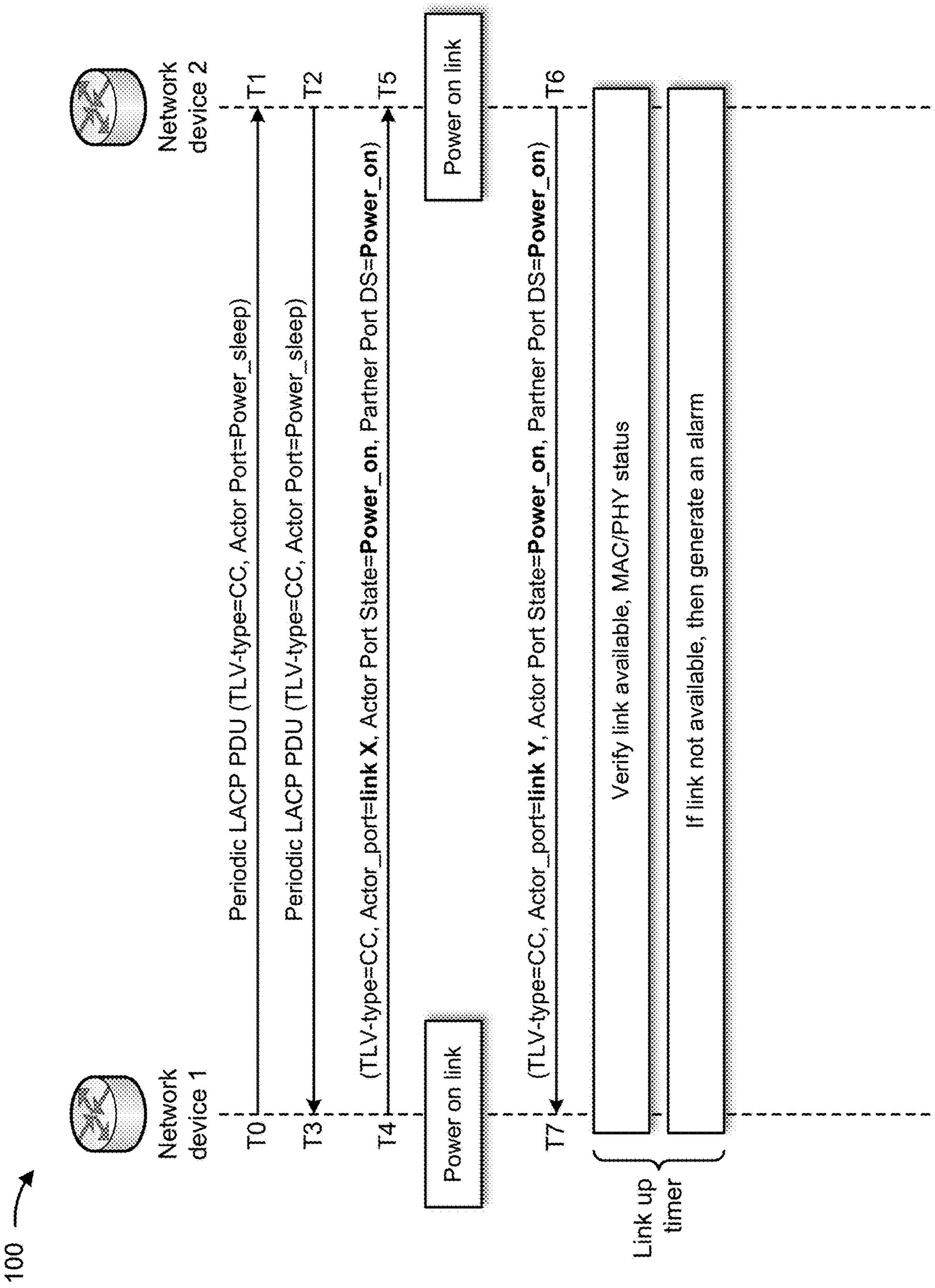

FIG. 1C depicts a call flow diagram associated with transitioning a link of a LAG from a power sleep state to a power on state. In some implementations, state transitions associated with a link may asynchronously occur. In some implementations, the network device 1 and the network device 2 may be associated with transitioning the link from the power sleep state to the power on state. The network device 1 may be associated with a link (e.g., link X) to transition from the power sleep state to the power on state, and the network device 2 may associated with a link (e.g., link Y) to transition from the power sleep state to the power on state. Initially, both network devices may transmit periodic LACP PDUs (e.g., via the control channel) with a TLV type of the control channel and an actor port set to the power sleep state. For example, at time T0, the network device 1 may transmit a first periodic LACP PDU to the network device 2, and the network device 2 may receive the first periodic LACP PDU at time T1. At time T2, the network device 2 may transmit a second periodic LACP PDU to the network device 1, and the network device 1 may receive the second periodic LACP PDU at time T3.

The network device 1 may initiate the transition from the power sleep state to the power on state. Thus, at time T4, the network device 1 may transmit a first LACP PDU (e.g., with an actor port associated with link X, an actor port state set to the power on state, and a partner port desired state set to the power on state) to the network device 2 via the control channel. The network device 2 may receive the first LACP PDU at time T5. The network device 1 may power on link X and the network device 2 may power on link Y based on the first LACP PDU. At time T6, the network device 2 may transmit a second LACP PDU (e.g., with an actor port associated with link Y, an actor port state set to the power on state, and a partner port desired state set to the power on state) to the network device 1 via the control channel. The network device 1 may receive the second LACP PDU at time T7.

As further shown in FIG. 1C, the network device 1 and the network device 2 may determine whether the link (e.g., links X and Y) is transitioned from the power sleep state to the power on state prior to expiration of a link up timer. If the link transitions to the power on state prior to expiration of the link up timer, the network devices 1 and 2 may verify that the link is available (e.g., at a media access control (MAC) layer and a physical (PHY) layer). If the link fails to transition to the power on state prior to expiration of the link up timer, the network devices 1 and 2 may determine that the link is not available and may generate a failure alarm. The network devices 1 and 2 may handle the reduction in LAG bandwidth by rerouting traffic. In some implementations, if the control channel link is unavailable (e.g., due to issues, such as control channel link failure) and detected, the network devices 1 and 2 may automatically power on all power sleep links and may elect a new control channel.

Figure 1D:
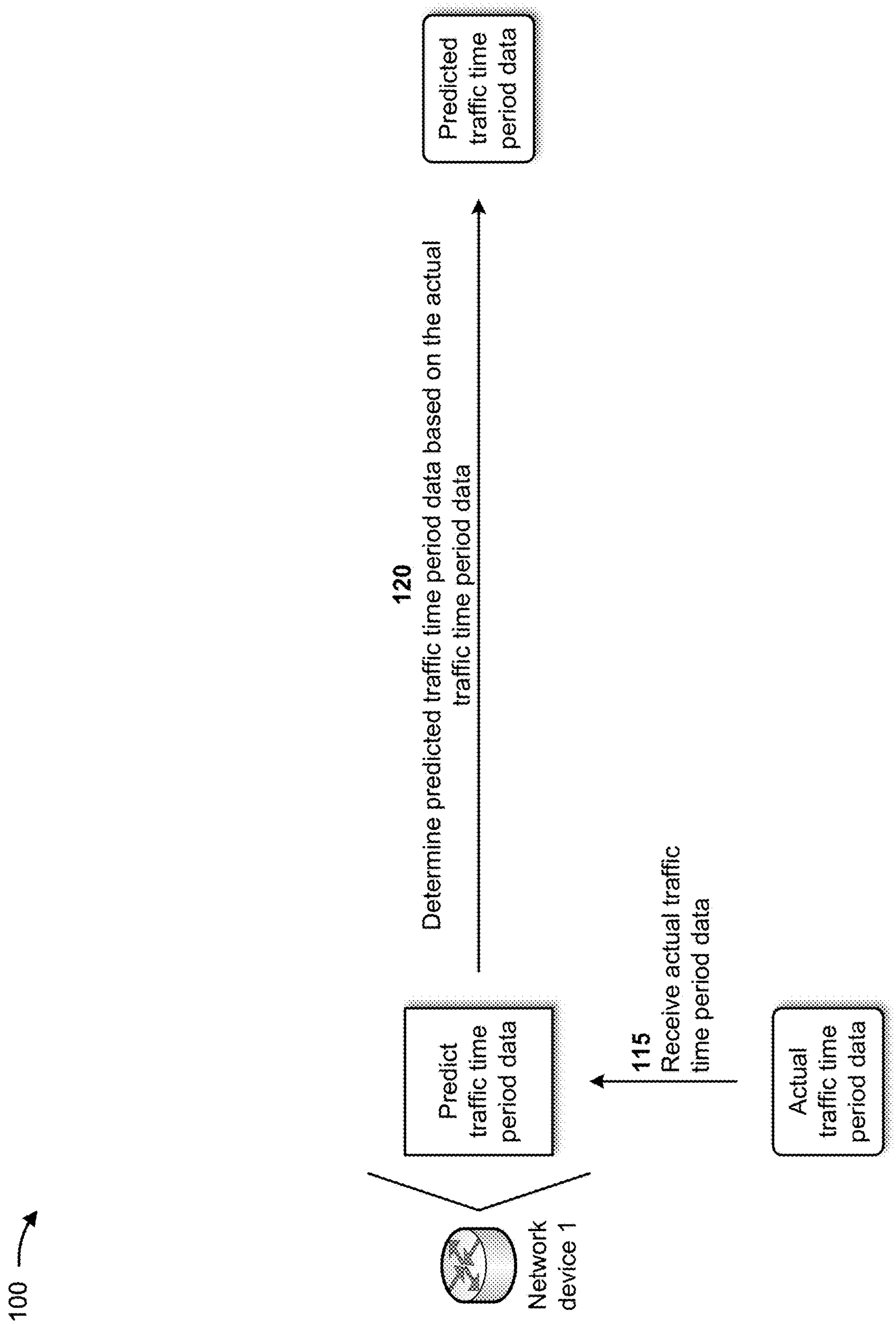
Figure 1E:
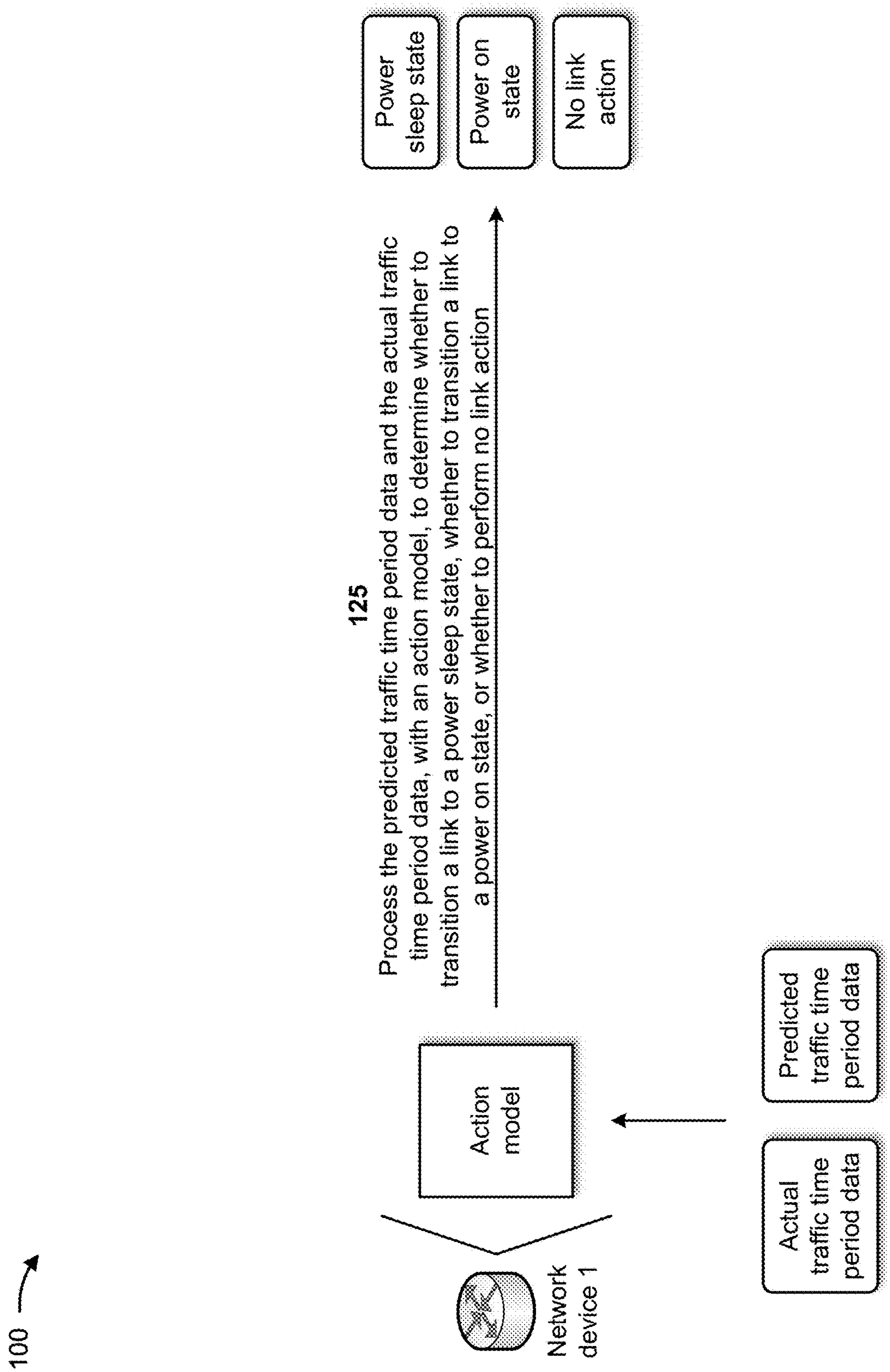

FIGS. 1D and 1E depict an example power saving method for telemetry data based on the protocol enhancements described above. As shown in FIG. 1D, and by reference number 115, the network device 1 may receive actual traffic time period data. For example, a traffic pattern over a LAG (e.g., LAG telemetry data) may be computed over a time period (e.g., fifteen minute time-of-day intervals, called "fifteen minute bins"). The traffic pattern may correspond to the actual traffic time period data. In some implementations, the network device 1 may continuously receive the actual traffic time period data, may periodically receive the actual traffic time period data, and/or the like. The network device 1 may store the actual traffic time period data in a data structure (e.g., a database, a table, a list, and/or the like) associated with the network device 1.

As further shown in FIG. 1D, and by reference number 120, the network device 1 may determine predicted traffic time period data based on the actual traffic time period data. For example, the network device 1 may include a predictive model that determines the predicted traffic time period data based on the actual traffic time period data. The network device 1 may process the actual traffic time period data, with the predictive model, to generate the predicted traffic time period data. In some implementations, during off-peak time, when the actual traffic time period data matches to the predicted traffic time period data, the model may cause a few LAG member links to be disabled by transitioning the links to the power sleep state. The model may cause a link to transition from the power sleep state to the power on state in response to increasing predicted traffic time period data or when the actual traffic time period data fails to match the predicted traffic time period data.

As shown in FIG. 1E, and by reference number 125, the network device 1 may process the predicted traffic time period data and the actual traffic time period data, with an action model, to determine whether to transition a link to a power sleep state, whether to transition a link to a power on state, or whether to perform no link action. For example, the network device 1 may include an action model that determines whether to transition a link to a power sleep state, whether to transition a link to a power on state, or whether to perform no link action based on the predicted traffic time period data and the actual traffic time period data. In some implementations, the action model may calculate variables at the beginning of every binning interval. The variables may include a maximum estimated LAG utilization for the binning interval (Pm); a guard bandwidth (Pg) that provides a margin of safety and is a user configurable parameter that depends on internal queue settings, traffic burst, hashing efficiency, link up time, and/or the like; a high threshold (e.g., Pt=Pm+2Pg) for the action model (e.g., a maximum predicted value with a guard for a binning interval); an instantaneous bandwidth utilization (Pc) (e.g., every second, every five seconds, and/or the like); a total LAG bandwidth ($L_{bw}$) calculated as a sum of all LAG links; and/or the like.

The action model may determine to transition the link to the power sleep state based on the following procedure. At the beginning of every binning interval, if ($Pt<L_{bw}$) and ($Pc<Pt$), the action model may determine whether any of the member links can be turned off, while still ensuring that $Pt<(L_{bw}$–member link bandwidth). If a member link can be turned off, the action model may transition the member link to the power sleep state. The action model may select an eligible member link based on configuration power priority settings or an iterative logic across eligible links. The action model may update the $L_{bw}$ (e.g., $L_{bw}=L_{bw}$–power sleep link bandwidth). When the LAG includes unequal member links, it is possible to power sleep various combinations of links. For example, a combination of links may be selected such that maximum a power gain may be obtained, while ensuring an available LAG bandwidth is greater than a predicted value.

The action model may determine to transition the link to the power on state based on the following procedure. The action model may continuously monitor the instantaneous traffic pattern (Pc). When the instantaneous traffic $Pc\geq Pm$, an additional link may be transitioned to the power on state from the power sleep state. The action model may recompute and/or update Pm (e.g., Pm=Pm+new link bandwidth) and may update $L_{bw}$ (e.g., $L_{bw}=L_{bw}$+power sleep link bandwidth). In some implementations, a dampening model may be utilized when traffic is significantly less than Pt during the binning interval. The action modem may retain a link in a power on state until a next reactive interval (e.g., a binning interval) to avoid further link transitions. In some implementations, at the beginning of the reactive interval, if $Pt>L_{bw}$, the action model may power on an additional minimal set of links such that Low is greater than Pt.

Since a LAG may include multiple member links, a network device initiating a transition to a power sleep state may identify a link to transition based on link power priorities of eligible links. The link power priorities may match for both peer network devices. Also, where link power priorities do not exist, the network device may reject a request or accept the request based on an estimated bandwidth. In some implementations, the binning interval may be similar at both peer network devices.

In some implementations, if a link is in a power sleep state for a long duration (e.g., multiple hours in a day), a periodic power on and power sleep mechanism may be enhanced to check for link sanity and to generate an alarm if required.

In this way, the network device manages power states of aggregated links of the network device. For example, the network device may utilize enhancements to an LACP to enable graceful transitions of power states of links in a LAG. The network device may also process actual traffic (e.g., in-system telemetry data) and predicted traffic (e.g., predicted telemetry data), with a model, to determine power state transitions of the links in the LAG, to manage the power states transitions of the links in the LAG, and/or the like. Thus, the network device conserves computing resources, networking resources, and/or the like that would otherwise have been consumed by failing to entirely power off the link, failing to power off components of a network device associated with the partially powered off link, losing traffic due to abruptly disabling the link, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
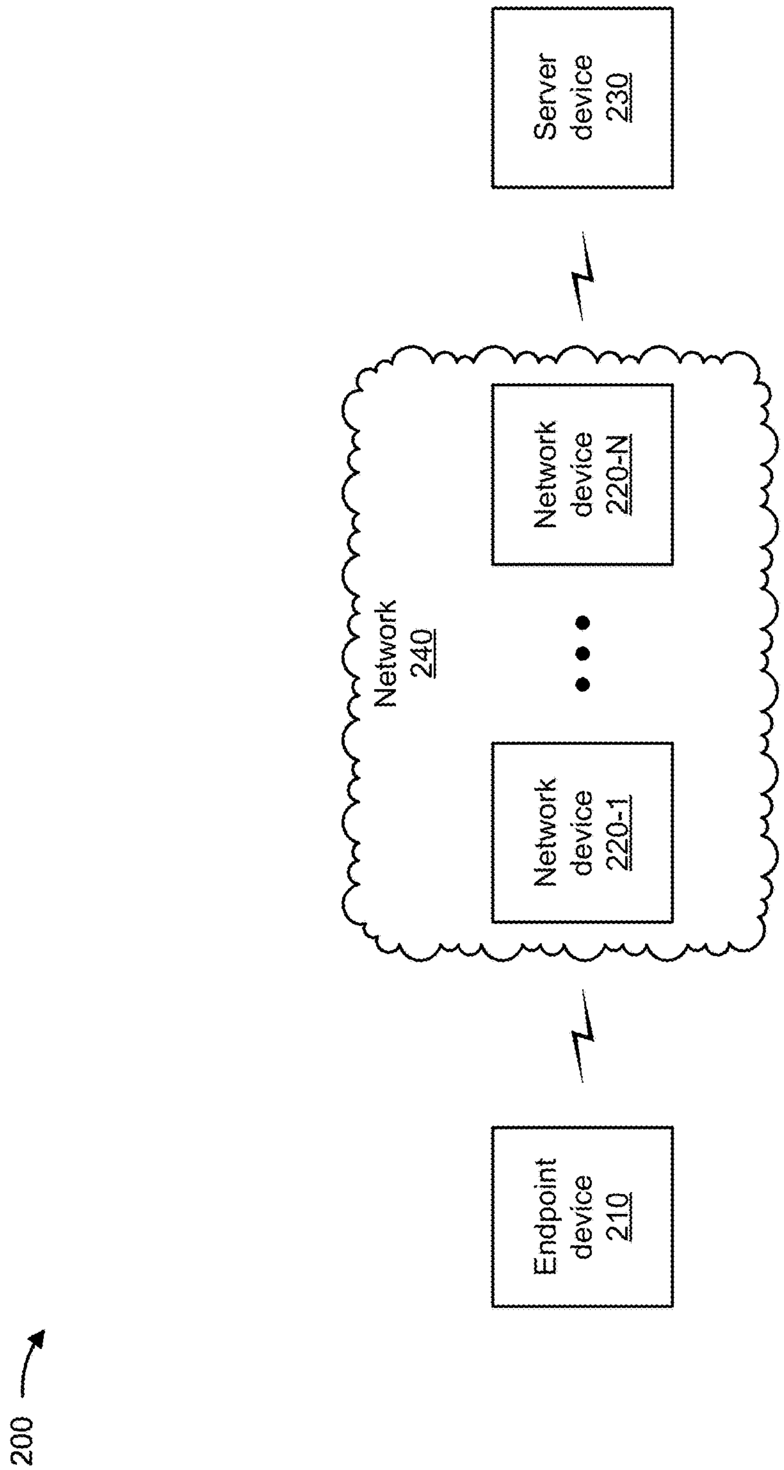
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 includes one or more devices capable of receiving, generating, storing, processing, and/or providing information, such as information described herein. For example, the server device 230 may include a laptop computer, a tablet computer, a desktop computer, a group of server devices, or a similar type of device, associated with multicast traffic. In some implementations, the server device 230 may receive information from and/or transmit information (e.g., multicast traffic) to the endpoint device 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
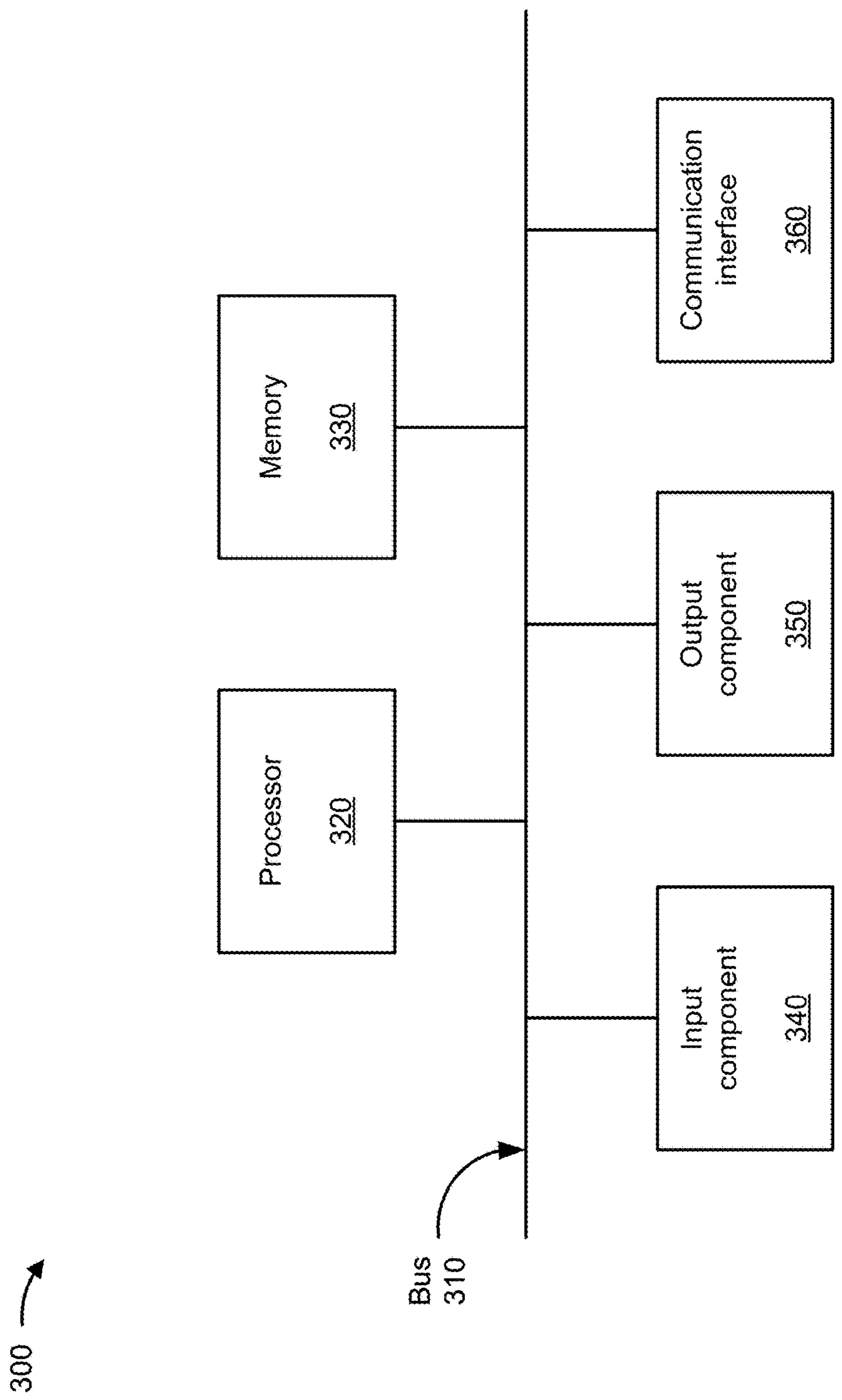
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
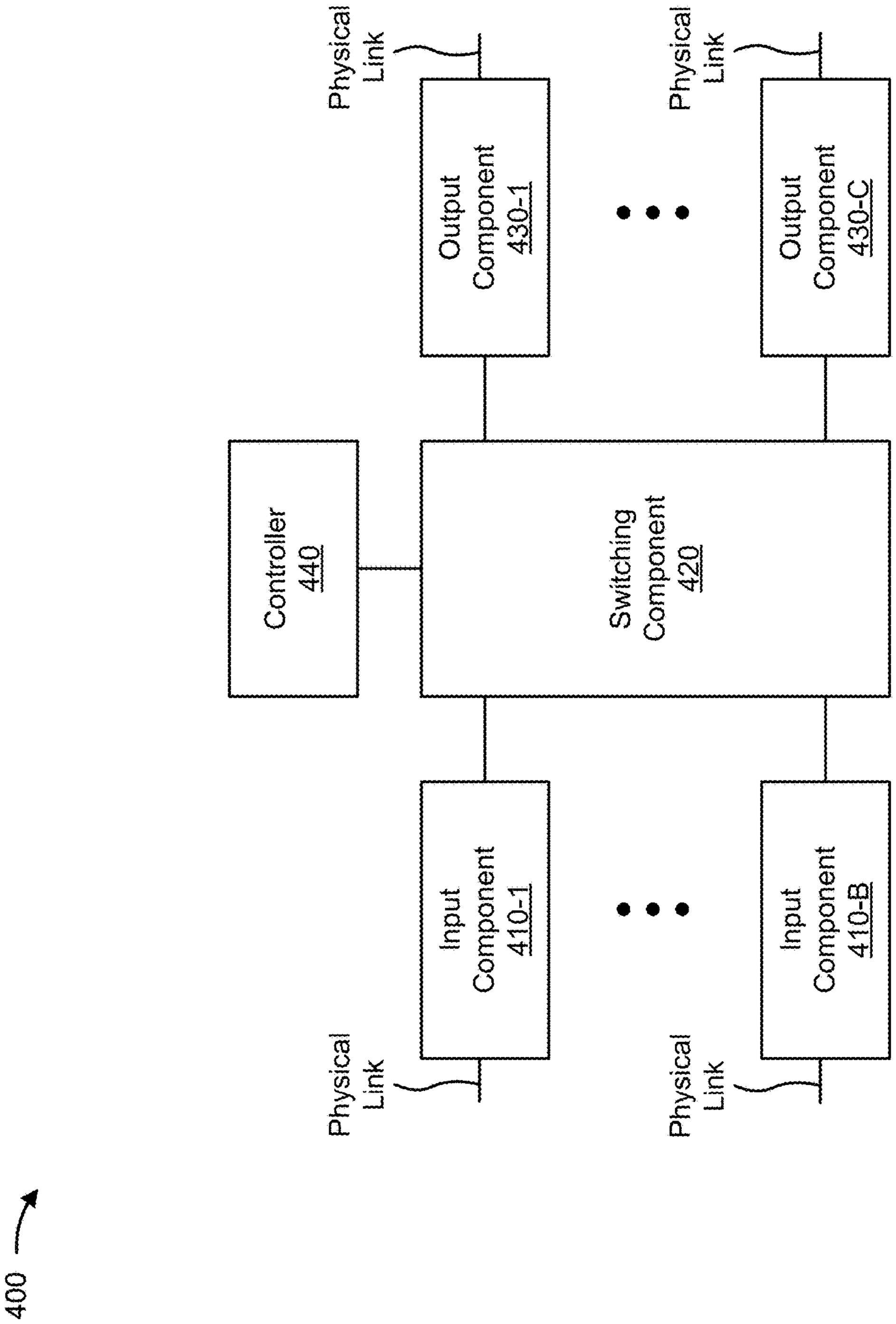

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
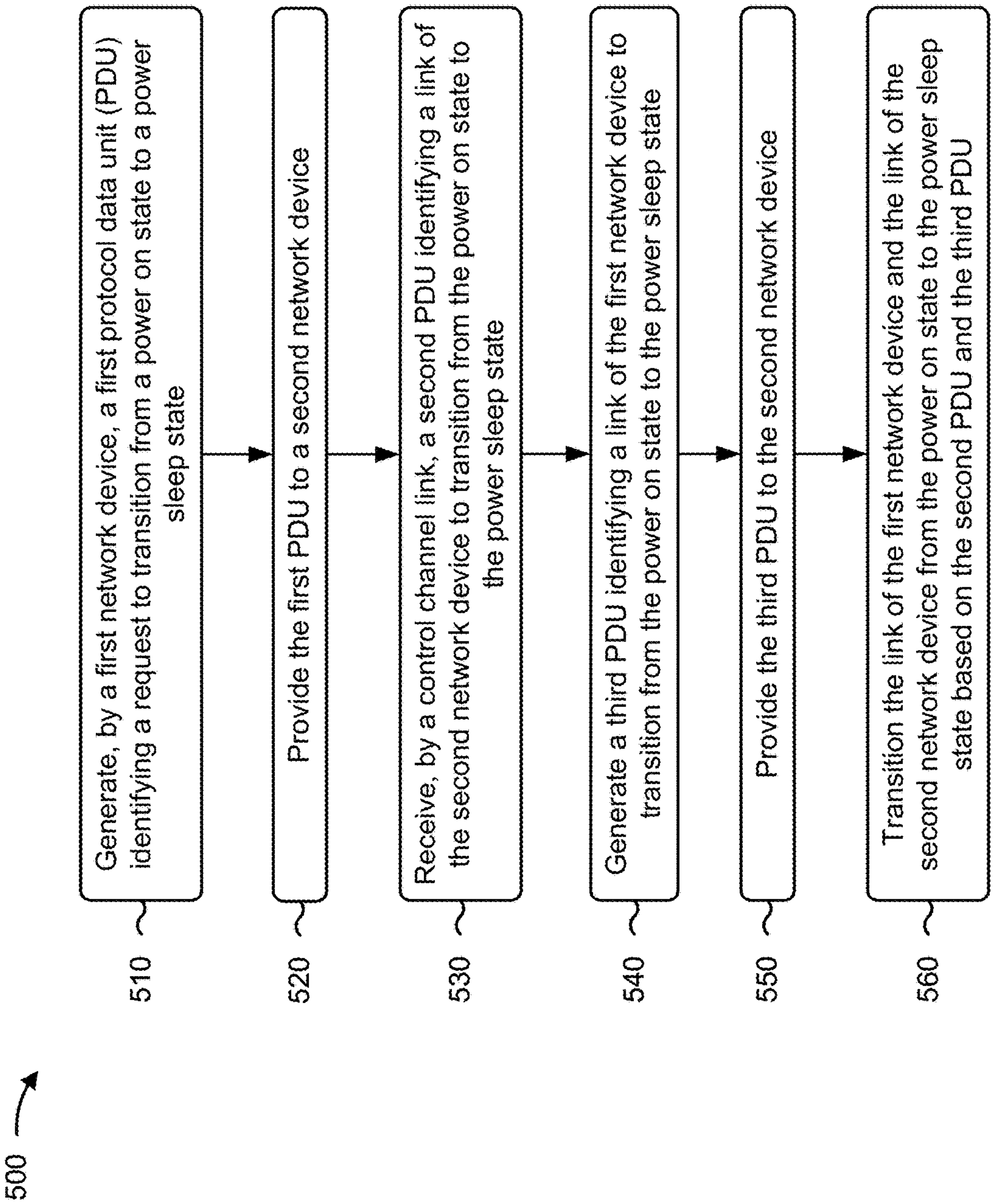
FIG. 5 is a flowchart of an example process for managing power states of aggregated links of a network device.

FIG. 5 is a flowchart of an example process 500 for managing power states of aggregated links of a network device. In some implementations, one or more process blocks of FIG. 5 may be performed by a network device (e.g., the network device 220). In some implementations, one or more process blocks of FIG. 5 may be performed by another device or a group of devices separate from or including the network device, such as a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include generating a first PDU identifying a request to transition from a power on state to a power sleep state (block 510). For example, the first network device may generate a first PDU identifying a request to transition from a power on state to a power sleep state, as described above.

As further shown in FIG. 5, process 500 may include providing the first PDU to a second network device (block 520). For example, the first network device may provide the first PDU to a second network device, as described above.

As further shown in FIG. 5, process 500 may include receiving a second PDU identifying a link of the second network device to transition from the power on state to the power sleep state (block 530). For example, the first network device may receive a second PDU identifying a link of the second network device to transition from the power on state to the power sleep state, as described above.

As further shown in FIG. 5, process 500 may include generating a third PDU identifying a link of the first network device to transition from the power on state to the power sleep state (block 540). For example, the first network device may generate a third PDU identifying a link of the first network device to transition from the power on state to the power sleep state, as described above.

As further shown in FIG. 5, process 500 may include providing the third PDU to the second network device (block 550). For example, the first network device may provide the third PDU to the second network device, as described above. In some implementations, each of the first PDU, the second PDU, and the third PDU is a LACP PDU.

As further shown in FIG. 5, process 500 may include transitioning the link of the first network device and the link of the second network device from the power on state to the power sleep state based on the second PDU and the third PDU (block 560). For example, the first network device may transition the link of the first network device and the link of the second network device from the power on state to the power sleep state based on the second PDU and the third PDU, as described above. In some implementations, transitioning the link of the first network device and the link of the second network device from the power on state to the power sleep state includes causing ports associated with the link of the first network device and the link of the second network device to be powered off. In some implementations, transitioning the link of the first network device and the link of the second network device from the power on state to the power sleep state includes determining whether a sleep timer has expired, and transitioning the link of the first network device and the link of the second network device from the power on state to the power sleep state based on determining that the sleep timer has expired.

In some implementations, process 500 includes exchanging one or more periodic link aggregation control protocol PDUs with the second network device. In some implementations, process 500 includes receiving an acknowledgement of the first PDU from the second network device. In some implementations, process 500 includes providing an acknowledgement of the second PDU to the second network device.

In some implementations, process 500 includes providing, to the second network device, a fourth PDU identifying a retransition of the link of the first network device from the power sleep state to the power on state, and receiving, from the second network device and in response to the fourth PDU, a fifth PDU identifying a retransition of the link of the second network device from the power sleep state to the power on state. In some implementations, process 500 includes verifying that the link of the first network device and the link of the second network device are available based on the fourth PDU and the fifth PDU, and transitioning the link of the first network device and the link of the second network device from the power sleep state to the power on state based on verification that the link of the first network device and the link of the second network device are available. In some implementations, process 500 includes determining that one of the link of the first network device or the link of the second network device is not available based on the fourth PDU and the fifth PDU, and generating an alarm based on determination that one of the link of the first network device or the link of the second network device is not available.

In some implementations, process 500 includes receiving actual traffic time period data, and determining predicted traffic time period data based on the actual traffic time period data. In some implementations, process 500 includes processing, the predicted traffic time period data and the actual traffic time period data, with an action model, to determine whether to transition the link of the first network device to a power sleep state, whether to transition the link of the first network device to a power on state, or whether to perform no link action on the link of the first network device. In some implementations, process 500 includes performing no link action on the link of the first network device based on determination that no link action is to be performed on the link of the first network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a first network device, actual traffic time period data;

processing, by the first network device, the actual traffic time period data, with an action model, to determine whether to transition a link of the first network device to a power sleep state;

generating, by the first network device, a first protocol data unit (PDU) identifying a request to transition from a power on state to the power sleep state;

providing, by the first network device, the first PDU to a second network device;

receiving, by the first network device, a second PDU identifying a link of the second network device to transition from the power on state to the power sleep state;

generating, by the first network device, a third PDU identifying the link of the first network device to transition from the power on state to the power sleep state;

providing, by the first network device, the third PDU to the second network device; and transitioning, by the first network device, the link of the first network device and the link of the second network device from the power on state to the power sleep state based on processing with the action model.

2. The method of claim 1, further comprising:

exchanging one or more periodic link aggregation control protocol PDUs with the second network device.

3. The method of claim 1, wherein each of the first PDU, the second PDU, and the third PDU is a link aggregation control protocol PDU.

4. The method of claim 1, further comprising:

receiving an acknowledgement of the first PDU from the second network device.

5. The method of claim 1, further comprising:

providing an acknowledgement of the second PDU to the second network device.

6. The method of claim 1, wherein transitioning the link of the first network device and the link of the second network device from the power on state to the power sleep state comprises:

causing ports associated with the link of the first network device and the link of the second network device to be powered off.

7. The method of claim 1, wherein transitioning the link of the first network device and the link of the second network device from the power on state to the power sleep state comprises:

determining whether a sleep timer has expired; and transitioning the link of the first network device and the link of the second network device from the power on state to the power sleep state based on determining that the sleep timer has expired.

8. The method of claim 1, further comprising:

providing, by the first network device and to the second network device, a fourth PDU identifying a retransition of the link of the first network device from the power sleep state to the power on state;

receiving, by the first network device and in response to the fourth PDU, a fifth PDU identifying a retransition of the link of the second network device from the power sleep state to the power on state; and transitioning, by the first network device, the link of the first network device and the link of the second network device from the power sleep state to the power on state based on the fourth PDU and the fifth PDU.

9. A first network device, comprising:

one or more memories; and one or more processors to:

receive actual traffic time period data;

process, the actual traffic time period data, with an action model, to determine whether to transition a link of the first network device to a power sleep state;

generate a first protocol data unit (PDU) identifying a request to transition from a power on state to the power sleep state;

provide the first PDU to a second network device;

receive a second PDU identifying a link of the second network device to transition from the power on state to the power sleep state;

generate a third PDU identifying the link of the first network device to transition from the power on state to the power sleep state;

provide the third PDU to the second network device; and transition the link of the first network device and the link of the second network device from the power on state to the power sleep state based on processing with the action model.

10. The first network device of claim 9, wherein the one or more processors are further to:

provide, to the second network device, a fourth PDU identifying a retransition of the link of the first network device from the power sleep state to the power on state; and receive, from the second network device and in response to the fourth PDU, a fifth PDU identifying a retransition of the link of the second network device from the power sleep state to the power on state.

11. The first network device of claim 10, wherein the one or more processors are further to:

verify that the link of the first network device and the link of the second network device are available based on the fourth PDU and the fifth PDU; and transition the link of the first network device and the link of the second network device from the power sleep state to the power on state based on verification that the link of the first network device and the link of the second network device are available.

12. The first network device of claim 10, wherein the one or more processors are further to:

determine that one of the link of the first network device or the link of the second network device is not available based on the fourth PDU and the fifth PDU; and generate an alarm based on determination that one of the link of the first network device or the link of the second network device is not available.

13. The first network device of claim 9, wherein the one or more processors are further to:

determine predicted traffic time period data based on the actual traffic time period data.

14. The first network device of claim 13, wherein the one or more processors, to process with the action model, are to:

process, the predicted traffic time period data and the actual traffic time period data, with the action model, to determine whether to transition the link of the first network device to a power sleep state.

15. The first network device of claim 9, wherein the one or more processors to transition the link of the first network device and the link of the second network device from the power on state to the power sleep state, are to:

cause ports associated with the link of the first network device and the link of the second network device to be powered off.

16. A non-transitory computer-readable medium storing a set of instructions, the set of instructions comprising:

one or more instructions that, when executed by one or more processors of a first network device, cause the first network device to:

receive actual traffic time period data;

process the actual traffic time period data and predicted traffic time period data, based on the actual traffic time period data, with an action model, to determine whether to transition a link of the first network device to a power sleep state;

generate a first protocol data unit (PDU) identifying a request to transition from a power on state to the power sleep state;

provide the first PDU to a second network device;

receive a second PDU identifying a link of the second network device to transition from the power on state to the power sleep state;

generate a third PDU identifying the link of the first network device to transition from the power on state to the power sleep state;

provide the third PDU to the second network device; and transition the link of the first network device and the link of the second network device from the power on state to the power sleep state based on the second PDU and the third PDU.

17. The non-transitory computer-readable medium of claim 16, wherein the one or more instructions further cause the first network device to:

exchange one or more periodic link aggregation control protocol PDUs with the second network device.

18. The non-transitory computer-readable medium of claim 16, wherein the one or more instructions, that cause the first network device to transition the link of the first network device and the link of the second network device from the power on state to the power sleep state, cause the first network device to:

cause ports associated with the link of the first network device and the link of the second network device to be powered off.

19. The non-transitory computer-readable medium of claim 16, wherein the one or more instructions further cause the first network device to:

provide, to the second network device, a fourth PDU identifying a retransition of the link of the first network device from the power sleep state to the power on state;

receive, from the second network device and in response to the fourth PDU, a fifth PDU identifying a retransition of the link of the second network device from the power sleep state to the power on state;

verify that the link of the first network device and the link of the second network device are available based on the fourth PDU and the fifth PDU; and transition the link of the first network device and the link of the second network device from the power sleep state to the power on state based on verification that the link of the first network device and the link of the second network device are available.

20. The non-transitory computer-readable medium of claim 16, wherein the one or more instructions that cause the first network device to transition the link of the first network device and the link of the second network device from the power on state to the power sleep state, cause the first network device to:

cause ports associated with the link of the first network device and the link of the second network device to be powered off.

21. The non-transitory computer-readable medium of claim 16, wherein the one or more instructions further cause the first network device to:

determine the predicted traffic time period data based on the actual traffic time period data; and wherein the one or more instructions that cause the first network device to to process with the action model, cause the first network device:

process, the predicted traffic time period data and the actual traffic time period data, with the action model, to determine whether to transition the link of the first network device to a power sleep state.

* * * * *